April 17, 1962  A. J. BAYLISS ETAL  3,030,513
ELECTRICAL APPARATUS FOR PROVIDING AN INDICATION
OF THE RELATING POSITIONS OF
RELATIVELY MOVABLE MEANS Filed Nov. 27, 1957  3 Sheets-Sheet 1

INVENTORS
ALAN JOHN BAYLISS
ERLE GARDNER
TERENCE BERNARD TOMLINSON
BY
ATTORNEYS

INVENTORS
ALAN JOHN BAYLISS
ERLE GARDNER
TERENCE BERNARD TOMLINSON
BY
ATTORNEYS

United States Patent Office 3,030,513
Patented Apr. 17, 1962

3,030,513
ELECTRICAL APPARATUS FOR PROVIDING AN INDICATION OF THE RELATING POSITIONS OF RELATIVELY MOVABLE MEANS
Alan John Bayliss and Erle Gardner, Wembley, and Terence Bernard Tomlinson, Harrow, England, assignors to The General Electric Company Limited, London, England
Filed Nov. 27, 1957, Ser. No. 699,347
Claims priority, application Great Britain Nov. 30, 1956
10 Claims. (Cl. 250—208)

The present invention relates to electrical apparatus for providing an indication of the relative positions, at least for relative positions within a predetermined range of such positions, of relatively movable means. The present invention is particularly, though not exclusively, applicable to coding apparatus for use, for example, in telemetering systems.

In telemetering systems it is a requirement that an indication of the magnitude of a given variable, for example, a voltage, as indicated, for example, by a meter, or like device, situated at a metering station, shall be reproduced, within the accuracy of the system, at a distant station. In order that such a requirement shall be satisfied, it has been proposed to transmit between the metering station and the distant station an electric signal which is dependent upon the indication given by the meter, or like device. This electric signal, when received by the distant station, is then utilised to indicate at that station the magnitude indicated by the meter, or like device.

The electric signal transmitted between the metering station and the distant station may be dependent in amplitude upon the indication given by the meter, or like device, however, this has the disadvantage that the amplitude of the signal when received at the distant station will, on normal circumstances, be dependent also upon the transmission characteristics of the medium through which that signal is transmitted between the two stations. This may result, therefore, in serious discrepancies between the actual magnitude of the variable, and the magnitude thereof as indicated at the distant station.

As a result of the above disadvantage it has been proposed to transmit information concerning the magnitude of a given variable to a distant station, by means of a coded electric signal in which the presence, rather than the amplitude, of electric code signals, each having a predetermined meaning, is used. For example, the information may be transmitted by a group of electric pulses representing, in a binary code, the magnitude of the variable expressed numerically. These pulses may be utilised at the distant station to provide, for example, a visible indication of this magnitude.

One disadvantage of using a coded electric signal for transmitting the required information lies in the provision of suitable coding apparatus at the metering station, to provide an appropriate indication, in code form, of the magnitude of the given variable, from which the required coded signal may be derived. Such coding apparatus is usually undesirably expensive and complex, involving the use of a large quantity of additional equipment at the metering station. It is therefore desirable to provide coding apparatus which may be used at a metering station in a telemetering system, to provide an indication, in code form, for example, in binary code, of the magnitude of a given variable, such apparatus being simple in construction, preferably cheap, and not involving the use of a large quantity of equipment.

It is an object of the present invention to provide electrical apparatus for providing an indication of the relative positions of relatively movable means, which is of relatively simple construction, and particularly, though not exclusively, such apparatus which may be used in, for example, a telemetering system, as coding apparatus.

According to the present invention, in electrical apparatus for providing an indication of the relative positions of a pair of relatively movable means, a plurality of photoconductive means are provided, and light is incident, in operation, upon one or more of said photoconductive means, the incidence of such light in said plurality of photoconductive means being dependent upon the relative positions of said relatively movable means, at least for relative positions of said relatively movable means within a predetermined range, each of said photoconductive means being such that if said light is incident upon that photoconductive means the electrical resistance of an electric path through that means is relatively low compared with that when no such light is incident upon that means, the particular combination of one or more of said photoconductive means through each of which there is such a relatively low resistance path providing an indication of the relative positions of said relatively movable means, at least for such positions within said predetermined range.

The term "light" is used herein to refer to any radiations which are normally visible to the human eye, and also to any similar radiations such as, for example, infrared and X-ray radiations, which are not so visible.

According to a feature of the present invention electrical coding apparatus for use, for example, in a telemetering system, to provide an indication, in code form, of the magnitude of a given variable, comprises a plurality of photoconductive means each of which comprises a first electrode, a second electrode, and photoconductive material interposed between said first electrode and said second electrode such that when light is incident upon that photoconductive material, the electrical resistance between said first electrode and said second electrode through that material, is relatively low compared with that when no such light is incident upon that photoconductive material, and means adapted to be displaced relative to said photoconductive means in dependence upon the instantaneous magnitude of said variable, to direct light to be incident upon the photoconductive material in one or more of said photoconductive means, such that the position or positions of incidence of such light in said plurality of photoconductive means is instantaneously dependent upon the magnitude of said variable, at least for magnitudes of said variable within a predetermined range of such magnitudes, and that, for each of those particular one or more photoconductive means, there is a relatively low resistance electric path bewteen the first electrode and the second electrode, through the photoconductive material interposed between those electrodes in that means, the apparatus being such that upon the application, in operation, of a voltage between the first electrode and the second electrode of each of said plurality of photoconductive means, the resultant current through the relatively low resistance path in each of the particular one or more photoconductive means, provides an indication of the identity of those one or more photoconductive means, and thereby an indication, in code form, of the magnitude of said variable, at least for such magnitudes within said predetermined range.

Coding apparatus for use in a telemetering system, according to the present invention will now be described, by way of example, with reference to the accompanying drawings in which.

Figure 1:
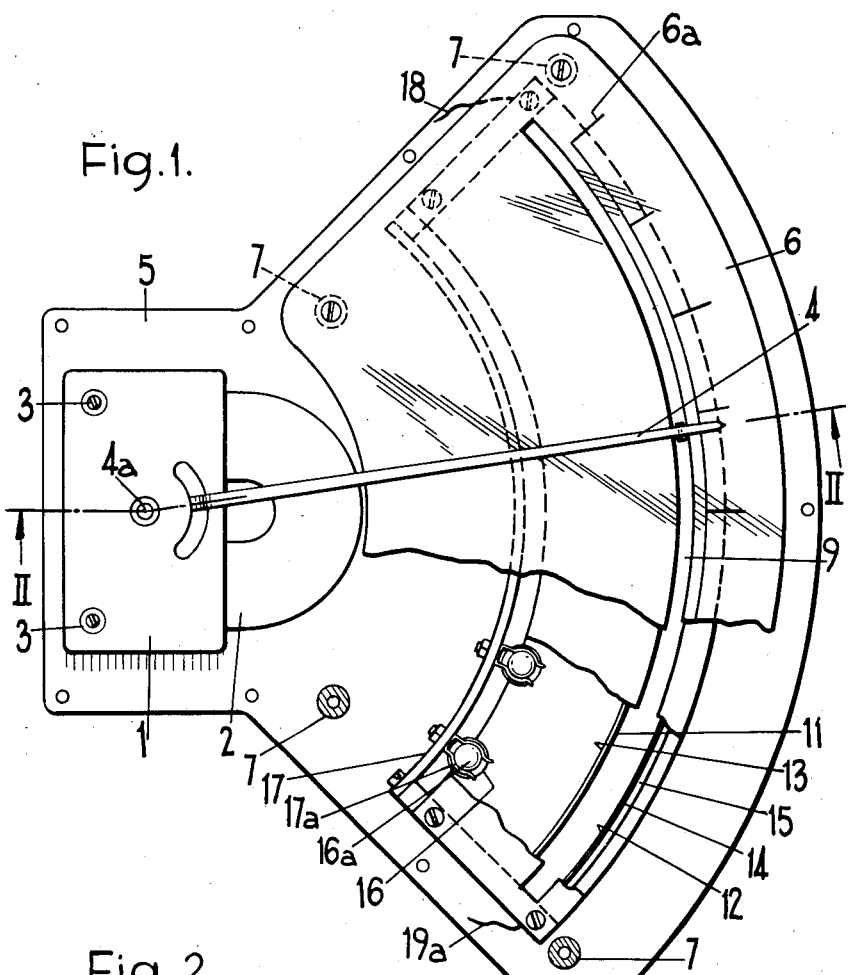
FIGURE 1 is a plan, partly in section, of the coding apparatus with the cover thereof removed.
Figure 2:
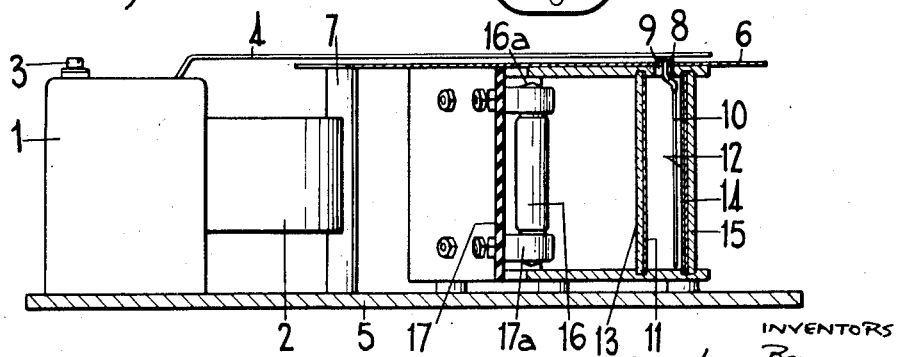
FIGURE 2 is a sectional elevation on the line II—II of FIGURE 1.

Referring to FIGURES 1 and 2, a moving coil meter movement 1 which incorporates a magnet 2, has two terminals 3 to which in operation a voltage signal is applied, the voltage amplitude of the signal applied between the terminals 3 determining the angular position, from some datum position thereof, adopted by an index 4 connected to the movement 1, in the normal manner.

In the following description the actual construction of the movement 1, which may be of any well-known form, will not be described in detail, since this is not of significance in a clear understanding of the present invention. In addition, for clarity the construction of the movement 1 has not been shown in the accompanying drawings.

The movement 1 is mounted upon a base-plate 5 above which a scale 6 is mounted by means of four posts 7 attached to the base-plate 5. It is arranged that the index 4 moves over the scale 6 about the axis 4a, the above-mentioned datum position of the index 4 being that in which the reading provided thereby, in relation to the scale 6, is zero (that is, in which the index 4 lies directly over the calibration 6a).

In the accompanying drawings the index 4 is shown in a position displaced from this datum position, for clarity.

The index 4 has a member 8 attached thereto, the member 8 projecting through a slot 9 in the scale 6 and retaining a thin mica strip 10 at right angles to the index 4. The mica strip 10, for movement of the index 4 over the scale 6, moves over a portion of an imaginary cylindrical surface, coaxial with the axis 4a, and, for the whole of such movement, moves between members 11 and 12 which are constrained to lie on imaginary cylindrical surfaces coaxial with, and spaced by short distances only from, that over which the mica strip 10 moves. The members 11 and 12 are constrained in this manner, by being retained in surface contact with a suitably curved glass member 13, and in surface contact with a member 14 which lies in contact with a suitably curved rigid member 15, respectively.

Six electric festoon lamps 16 (of which only some are shown) are arranged to illuminate that curved surface of the glass member 13 which is remote from the member 11, it being arranged that any light incident upon the glass member 13 from the lamps 16 is diffused thereby. Electrical connection is made to end contacts 16a of the lamps 16 by means of spring clips 17a (of which only some are shown), attached to a suitably curved baseboard 17.

The members 11 and 12 are manufactured of a material, such as that sold under the Registered Trade Mark "Polaroid," which will allow only light polarised in a given plane of polarisation to pass therethrough, and it is so arranged that, in operation, light from the lamps 16 which passes through the member 11 after being diffused through the glass member 13, has a plane of polarisation which is at right angles to the plane of polarisation of light which will pass through the member 12. In addition, it is arranged that the mica strip 10 is such that the plane of polarisation of plane polarised light incident thereon from the lamps 16 after passage through the member 11, is rotated through a right angle.

The coding apparatus shown in FIGURES 1 and 2 is provided with a cover (not shown) in the normal manner, such that those parts of the meter described above, are totally enclosed. This cover has a transparent portion through which the position of the index 4 relative to the scale 6 may be viewed, but is such that substantially no light other than that emitted in operation by the lamp 16, may be incident upon the mica strip 10 and the members 11 to 15.

In operation, the lamps 16 are caused to emit light by passing an electric current, from a suitable source (not shown), between the electrodes 16a of each of the lamps 16. Light incident upon the glass member 13 is diffused thereby, and only that component of this diffused light which has a plane of polarisation substantially parallel to the plane of polarisation of light which may pass through the member 11, will pass through the member 11 to be incident upon the mica strip 10 and the member 12. The light so incident upon the mica strip 10 and the member 12 is, in this manner, plane polarised, and the light incident upon the mica strip 10 passes therethrough, to be incident upon the member 12 also.

The plane of polarisation of the light directly incident upon the member 12 from the member 11, is at right angles to the plane of polarisation of light which will pass through the member 12, and therefore none of the light which is directly incident upon the member 12 from the member 11, will pass through the member 12. However, as stated above, it is arranged that the plane of polarisation of light incident upon the mica strip 10 from the member 11 is rotated through a right angle thereby, hence, that light incident upon the member 12 after passage through the mica strip 10, passes through the member 12 to be incident upon the member 14. In this manner therefore, a shaft of light corresponding in cross-sectional dimensions to the dimensions of the major faces of the mica strip 10, will be incident upon the member 14, the actual position of incidence of this light relative to the member 14 being determined by the instantaneous position of the index 4 relative to the scale 6, that is, in dependence upon the instantaneous reading of the meter.

As will be explained later, the member 14 which is, in general, opaque, has a number of transparent portions therein, and thus, in general, a portion of the light which is incident upon the member 14 will be passed therethrough to be incident upon the member 15. The member 15, to which an input lead 18 and seven output leads 19a to 19g (of which only the lead 19a is shown) are connected, is such that, when light is incident thereon through the member 14, the electrical resistance between the lead 18 and each of the leads 19a and 19g individually, provides an indication of the reading of the meter.

In order to explain the operation of the coding apparatus shown in FIGURES 1 and 2, reference will now be made to FIGURE 3 in which the mica strip 10 and the members 11 to 15, shown in cross-section, are represented in a substantially enlarged and exaggerated form. The general relative positions of the mica strip 10 and the members 11 to 15, as shown in FIGURES 1 and 2 have been retained in FIGURE 3, except that, for clarity, the members 11 and 13, and the members 12, 14 and 15 are shown spaced apart from one another.

Figure 3:
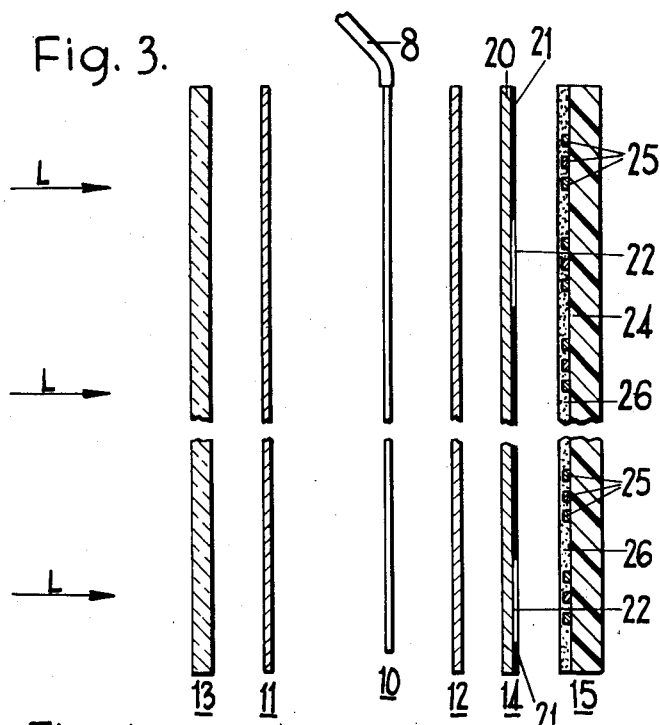
FIGURE 3 is an explanatory drawing of part of the coding apparatus.

Referring to FIGURE 3, a shaft of light derived, by the combination of the mica strip 10 and the members 11 and 12, from the light incident (as indicated by the arrows L) on the member 13, is, as explained above, caused to be incident upon the member 14. The member 14 is formed by a celluloid sheet 20 which bears a photographic emulsion 21, the emulsion 21 having been removed at certain predetermined positions in the member 14, by a normal photographic process, in order that transparent portions 22 occur at those positions.

In view of the existence of the transparent portions 22 in the member 14 a part of the shaft of light incident upon the member 14, will be incident upon the member 15 at positions thereof which lie behind the transparent portions 22, that is, which are adjacent to the transparent portions 22 on that side of the member 14 remote from the strip 10.

The member 15 is constituted by a plastic base-plate 24 upon which a number of copper strips 25 (some only of which are indicated) are formed, a photoconductive layer 26 being deposited over the copper strips 25. It is arranged that the electrical resistance of the electrc path between adjacent ones of the copper strips 25, through that portion of the photoconductive layer 26 interposed between those copper strips 25, is normally, that is, when no light falls on that portion of the photoconductive layer 26, relatively high, whilst when light is caused to be incident upon that portion of the photoconductive layer 26, that resistance is relatively low.

Hence, that part of the shaft of light incident upon the member 14, which is also incident upon the member 15, will cause the resistance of the electric paths between adjacent ones of the copper strips 25, through those portions of the photoconductive layer 26 which lie behind the transparent portions 22 of the member 14, to assume a relatively low value. The resistance of the electric path between adjacent ones of the copper strips 25, through those portions of the photoconductive layer 26 which lie behind the opaque portions 21 of the member 14, will, however, remain at a relatively high value, since no light will fall on those portions of the layer 26.

Figure 4:
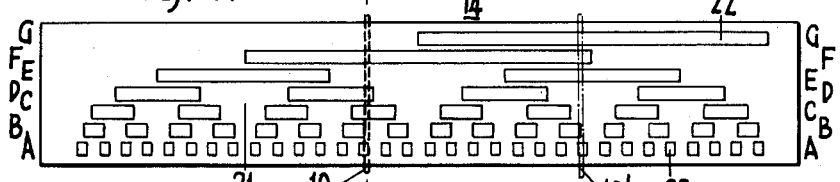
FIGURE 4 is an elevation of a component of the coding apparatus.

The form of the member 14 is shown in FIGURE 4, the section of the member 14 in FIGURES 2 and 3 being taken on the line III—III of FIGURE 4. The relative position of the mica strip 10 in front of the member 14 in FIGURES 1, 2 and 3 is indicated in broken lines in FIGURE 4.

The elevation of the member 14 of FIGURE 4, is that which is obtained when the member 14 lies wholly on a planar surface, and not that which would be obtained by viewing the member 14 when situated in the coding apparatus of FIGURES 1 and 2, that is when constrained to lie in surface contact with the curved member 15.

Referring to FIGURE 4, the member 14, as stated above, has opaque portions 21 and transparent portions 22, however, in general, the member 14 is opaque having the transparent portions 22 thereof arranged in rows A to G. The rows A to G each lie, when the member 14 is situated in the meter shown in FIGURES 1 and 2, along an arc of the imaginary cylindrical surface on which the member 14 lies.

The transparent portions 22 in the row A each have a length, and are separated from each other by a distance (taken in the direction along that row), which is double the width of the mica strip 10. The "width" of the mica strip 10 is that dimension thereof which is taken at right angles to the plane of the section in each of FIGURES 2 and 3.

Each of the transparent portions 22 in the rows B, C, D and E, have lengths, and are separated from adjacent transparent portions 22 in those rows by distances, which are multiples of four, eight, sixteen and thirty-two, respectively, of the width of the mica strip 10. In addition, the transparent portion 22 in the row F has a length which is a multiple of sixty-four of the width of the mica strip 10, the transparent strip 22 in the row G extending from a position which is approximately half-way along the effective length of the member 14 to the end thereof.

Figure 5:
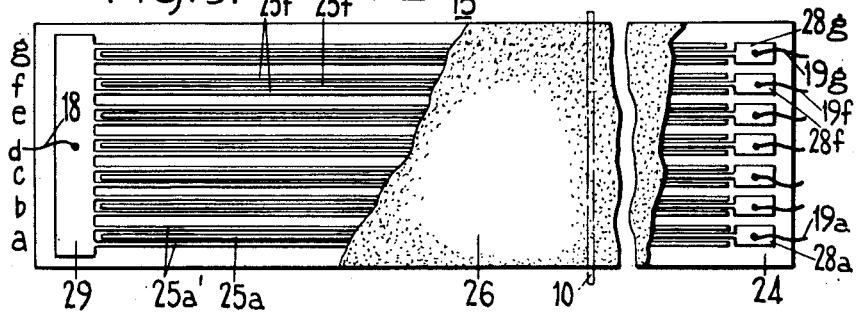
FIGURE 5 is a part sectional elevation of another component of the coding apparatus.

Referring now to FIGURE 5, the member 15, which is shown partly in section, comprises, as stated above, the base-plate 24, the copper strips 25 (some only of which are referenced 25a, 25a′, 25f, and 25f′), and a layer of photoconductive material 26. It will be appreciated that the elevation of the member 15 in FIGURE 5 is that which would be obtained by causing the member 15 to lie wholly within a given plane, and is, therefore, not a true elevation of the curved member 15.

The copper strips 25 are arranged in rows $a$ to $g$ which correspond in positioning to the rows A to G of the member 14, and such that each of the rows $a$ to $g$ of the member 15 lies directly behind the corresponding one of the rows A to G of the member 14 when positioned in the coding apparatus as shown in FIGURES 1 and 2.

The copper strips 25 are arranged in the rows $a$ to $g$ such that there are three of the strips 25 in each of these rows, that one of the strips 25 in each of the rows $a$ to $g$ which is situated between the other two of the strips 25 in that one of the rows $a$ to $g$ being connected to an individual one of seven contacts $28a$ to $28g$. For example, the strip 25 in the row $a$ which is connected to the contact $28a$ is that which is referenced $25a$ in FIGURE 5, and the strip 25 in the row $f$ which is connected to the contact $28f$ is that which is referenced $25f$ in that figure. The leads $19a$ to $19g$ are connected to individual ones of the contacts $28a$ to $28g$.

The other two strips 25 in each row are connected to a common contact 29, to which the input lead 18 is connected. For example, the strips 25 in the row $a$ which are connected to the contact 29 are those which are referenced $25a'$ in FIGURE 5, and the strips 25 in the row $f$ which are connected to the contact 29 are those which are referenced $25f'$ in that figure.

The relative position, as shown in FIGURES 1, 2 and 3, of the mica strip 10 in front of each of the members 14 and 15 is indicated in broken lines in each of FIGURES 4 and 5, and it will be observed, with reference to FIGURES 4 and 5, that light will be incident, for this position of the mica strip 10, only upon those portions of the photoconductive layer 26 which lie directly above the rows $a$, $c$, $d$ and $f$ within the broken lines representing the position of the mica strip 10. Thus the electrical resistance of each of the electric paths extending from the lead 18 through those strips 25 in the rows $a$, $c$, $d$ and $f$ which are connected to the contact 29, and the strips 25 connected to the contacts $28a$, $28c$, $28d$ and $28f$, to the leads $19a$, $19c$, $19d$ and $19f$, will be relatively low, whilst the electrical resistance of each of the electric paths extending from the lead 18 through the strips 25 in the rows $b$, $e$ and $g$ which are connected to the contact 29, and the strips 25 which are connected to the contacts $28b$, $28e$ and $28g$, to the leads $19b$, $19e$ and $19g$, will be relatively high.

The relatively low resistance condition between the lead 18 and each of the leads $19a$, $19c$, $19d$ and $19f$ (or, likewise, the relatively high resistance condition between the lead 18 and each of the leads $19b$, $19e$ and $19g$) provides an indication of the position of the mica strip 10 over the members 14 and 15, since the transparent portions 22 in the member 14 are arranged in a predetermined manner such that, for each position of the mica strip 10 relative to the member 14, there is a unique combination of transparent portions 22 lying directly behind the mica strip 10 in the rows A to G. Thus the particular combination of the leads $19a$ to $19g$ between each of which and the lead 18 there is a relatively low, or, alternatively, relatively high, resistance path, is peculiar to the particular position at that time of the mica strip 10 relative to the member 14. Such a combination is, therefore, peculiar to the particular position of the index 4 relative to the scale 6, that is, to the particular instantaneous reading of the meter in the coding apparatus.

An example of the manner in which the coding apparatus shown in FIGURES 1 and 2 may be incorporated in a telemetering system will now be described with reference to FIGURE 6, in which the coding apparatus of FIGURES 1 and 2 is represented schematically and is ascribed the reference "30."

Figure 6:
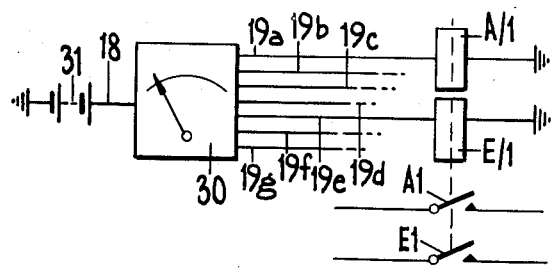
FIGURE 6 is a schematic explanatory drawing.

Referring to FIGURE 6, the lead 18 (corresponding to the lead of like reference in FIGURE 5) of the coding apparatus 30, is connected to the positive pole of a battery 31, the negative pole of which is connected directly to earth. Each of the leads 19a to 19g (corresponding to the leads of like reference in FIGURE 5) of the coding apparatus 30, is connected through the winding of an individual one of seven relays A/1 to G/1 (of which only the relays A/1 and E/1 are shown) to earth. The relays A/1 to G/1 have sets of contacts A1 to G1, respectively (of which only the relay contacts A1 and E1 are shown), and are each such that the contact (of the contacts A1 to G1) of that relay remains open while that relay remains unoperated.

It is arranged that for each of the relays A/1 to G/1, that relay remains unoperated while there is ta relatively high resistance path (as hereinbefore referred to), through the coding apparatus 30, between the lead 18 and that one of the leads 19a to 19g to which that relay is connected, but that that relay will be operated while there is a relatively high resistance path (as hereinbefore referred to) between the lead 18 and that one of the leads 19a to 19g.

The operation of any of the relays A/1 to G/1 will result in the closing of the contacts of those relays, that is, of the corresponding ones of the contacts A1 to G1. In this manner therefore, the reading of the coding apparatus 30 will be identified by the particular ones of the contacts A1 to G1 which are closed (or, of course, in an equivalent manner, by the particular ones of the contacts A1 to G1 which are open).

For example, if as described above, there are relatively low resistance paths between the lead 18 and each of the leads 19a, 19c, 19d and 19f only, then each of the relays A/1, C/1, D/1 and F/1 will be operated causing the contacts A1, C1, D1 and F1 to close. The contacts B1, E1 and G1 will remain open since the relays B/1, E/1 and G/1 will not be operated.

In order that the information represented by the condition, either closed or open, of the contacts A1 to G1 may be transmitted to the distant station each of the contacts A1 to G1 may be incorporated into an electric circuit (not shown) which produces an output pulse when and, only when, for example, that one of the contacts A1 to G1 is closed, the outputs from each of the circuits being passed, in turn, for transmission to the distant station (not shown) in the form of a pulse code modulated signal. The information concerning the readings of a group of meters each incorporated within coding apparatus such as the coding apparatus 30, may be transmitted to the distant station in this manner, each of the meters being allocated a time interval in a recurring succession of such intervals during which the coded representation of the reading of that meter is transmitted.

An example of a telemetering system within which the coding apparatus described above may be used, is disclosed in British patent specification No. 713,476, this system being used to transmit between a metering station and a distant station an indication of the magnitude of each of ten variables. The indications concerning the ten variables are transmitted between the metering and distant stations over ten times interlaced communication channels, the information concerning any one particular variable being transmitted in only one particular channel such that the information concerning different variables is transmitted in different channels. The indications of the magnitudes of the variables, are transmitted over the ten time interlaced communication channels as seven digit binary coded signals, the seven digits of each such signal being transmitted during the interval allotted to this channel.

From patent specification No. 713,476, it will be appreciated that to utilize the arrangement described above with reference to FIGURE 6 of the drawings accompanying the present specification, in the telemetering system disclosed in patent specification No. 713,476, it is only necessary that the contacts A1 to G1 shall be connected to constitute the switches S1 to S7, respectively, of the circuit described with reference to FIGURE 6 of the drawings accompanying that specification.

The actual form of the code for transmitting the reading of the meter in the coding apparatus 30, to the distant station, will depend on the manner in which the transparent portions 22 are arranged in the member 14. In the member 14 as shown in FIGURE 4, the portions 22 are in fact arranged such that the coded signal transmitted to the distant station represents this reading in a seven digit reflected binary cyclic permuted code, such as described in British patent specification No. 663,872 with reference to FIGURE 2 of the drawings accompanying that specification. Such a code has the advantage that decoding may be performed simply, and that the coded signals representing consecutive readings differ from each other in only one digital place. For example, as indicated by reference to FIGURE 4, the reading of the meter as shown in FIGURES 1, 2 and 3, may be represented, and therefore transmitted as, the binary coded form:

0 1 0 1 1 0 1 it being assumed that the binary digits "0" and "1" represent high and low resistance conditions, respectively, of the paths between the lead 18 and the leads 19a to 19g. (The digits are arranged here such that, reading from right to left, the resistance condition of the paths from the lead 18 to each of the leads 19a to 19g, taken in that order, are also indicated in that order.)

The corresponding coded forms for readings of the meter on either side of the above coded form are:

0 1 0 1 1 1 1 and 0 1 0 1 1 0 0 each of which differs in only one digital place from:

0 1 0 1 1 0 1 indicated above.

In this manner therefore, any errors in the coding of the reading of the meter due to the positioning of the mica strip 10 over the member 14, such that the reading of the meter is between two distinct consecutive digital values, is substantially obviated, due to the fact that the coded form actually transmitted will be one or other, only, of the two coded forms representative of those two digital values.

For example, if the mica strip 10 were to occupy that position over the member 14 indicated by the broken lines 10' in FIGURE 4, then either the binary coded form:

1 1 1 0 0 1 1 or, alternatively, the binary coded form:

1 1 1 0 0 0 1 would be transmitted to the distant station, the reading of the meter in this example (that is, for which the mica strip 10 is assumed to occupy the position indicated by the broken lines 10'), being between those readings which are represented in digital form by the binary coded forms:

1 1 1 0 0 1 1 and 1 1 1 0 0 0 1

It will be appreciated that the coding apparatus described above with reference to FIGURES 1 to 5, in addition to being adapted to provide an electrical indication of the voltage amplitude of an electric signal applied between the terminals 3, is adapted to provide, by means of the index 4 and the scale 6, a visual indication of this amplitude also.

The member 14 may be manufactured by any well-known photographic method such that the opaque portions 21 and the transparent portions 22 are formed on the celluloid sheet 20 in the required manner. Alternatively, for example, the member 14 may be provided by an opaque card (not shown) having suitable holes punched therethrough at appropriate positions therein, such that the remaining portions of this card correspond to the opaque portions 21, whilst the holes therethrough correspond to the transparent portions 22.

The member 15 may be manufactured by forming the copper strips 25 on the base-plate 24, for example, by a printed circuit technique. Such a technique may include, for example, the steps of forming a layer of copper on the base-plate 24 and then suitably etching this layer to form the strips 25, the contacts 28a to 28g, and the contact 29.

The actual form of the member 15 may be modified in order to overcome a disadvantage which may be found in the construction of the member 15 as described with reference to FIGURE 3. This disadvantage lies in the fact that it is normally difficult to obtain a sufficiently even distribution of the photoconductive material in the layer 26 for small layer thicknesses. As a result, it may be necessary to make the thickness of the layer 26 relatively large, which, for a given intensity of illumination by the lamps 16, thereby reduces the intensity of any light which is transmitted through the layer 26 to be incident upon that part of the photoconductive material of the layer 26 which lies directly between the strips 25. This reduction in intensity acts to reduce the difference between the resistance of the electric path through the photoconductive material between adjacent ones of the strips 25, when light is, and when light is not, incident upon the layer 26, that is, acts to reduce the difference, for a given intensity of illumination by the lamps 16, between the relatively low resistance path and the relatively high resistance path referred to above.

The member 15 may be modified to overcome this disadvantage, for example, by arranging that the base-plate 24 is transparent and that that part of the shaft of light incident upon the member 14 which is also incident upon the member 15, passes through this transparent base-plate 24 before being incident upon the photoconductive layer 26. If then, the strips 25 are sufficiently spaced from one another, light will be incident directly upon the photoconductive material of the layer 26 which lies between adjacent ones of the strips 25. However, in this modification it is necessary to ensure that there is substantially no dispersion in the transparent base-plate 24.

The member 15 alternatively, may be constructed, for example, by providing a transparent electrically conductive layer, for example, a layer of tin oxide, on a suitable base-plate such as the base-plate 24, depositing a photoconductive layer such as the layer 26, on this transparent conductive layer, and then applying seven separate elongated electrodes, for example, of tin foil, to the free surface of this photoconductive layer such that these electrodes are mutually parallel along the length thereof, and occupy positions in the meter which correspond to the positions of the rows a to g respectively, of the member 15 described with reference to FIGURE 5.

Figure 7:
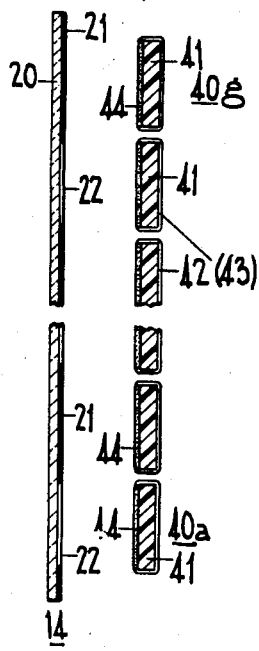
FIGURE 7 is a sectional elevation of parts of components utilised in a modification of the coding apparatus shown in FIGURES 1 and 2.
Figure 8:
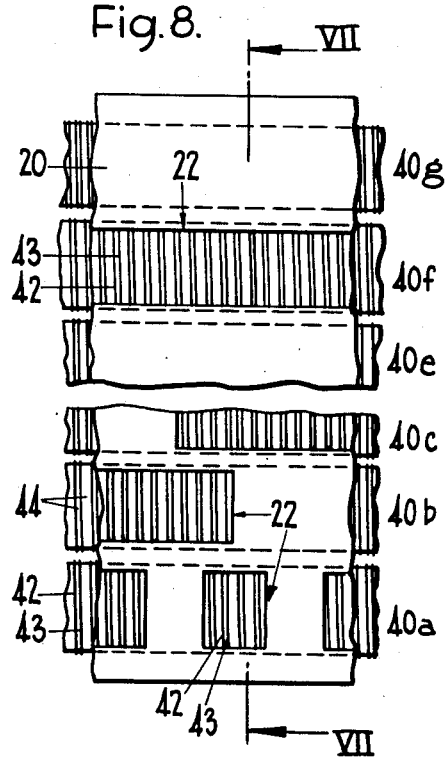
FIGURE 8 is an elevation of the parts of the components shown in FIGURE 7, the section of FIGURE 7 being taken on the line VII—VII of FIGURE 8.

Referring now to FIGURES 7 and 8, the member 15 may be replaced by seven identical members 40a to 40g (of which some only are shown), each of the members 40a to 40g lying along corresponding ones of the positions defined by the rows a to g of the member 15 in the meter shown in FIGURES 1 and 2. The member 14 has been represented in FIGURE 7 in order that the relative positions of the members 40a to 40g when incorporated in the meter of FIGURES 1 and 2, may be appreciated, FIGURE 7 thereby corresponding to that part of FIGURE 3 which depicts the members 14 and 15, when the member 15 is replaced by the members 40a to 40g.

Each of the members 40a to 40g comprises an electrically non-conductive member 41, two bare metal wires 42 and 43 wound to lie parallel to each other over the whole length of the member 41, and a photoconductive layer 44. The wires 42 and 43 are so wound upon each of the members 41 that there is no direct electrical connection therebetween, the photoconductive layer 44 being deposited between those portions of the wires 42 and 43 which lie over the surfaces of the members 41 which are adjacent to the member 14. The members 41 are constrained to lie on the imaginary cylindrical surface coaxial with the axis 4a, upon which the member 15 lies when incorporated in the meter of FIGURES 1 and 2.

The wire 42 in each of the members 40a to 40g is connected to a common lead (not shown) which corresponds to the lead 18 of FIGURES 1, 2 and 5, whilst for each of the members 40a to 40g, the wire 43 is connected to an individual one of seven leads (not shown) which correspond to the leads 19a to 19g respectively, of FIGURES 1, 2 and 5.

In operation, that part of the shaft of light incident upon the member 14 which passes through the transparent portions 22 will be incident upon the member 41 in each of a particular combination of the members 40a to 40g. This light causes the electrical resistance between the wires 42 and 43, in each of these particular members 40a to 40g, to fall from a relatively high value to a relatively low value.

The provision of members 40a to 40g, whilst these are analogous in function to the member 15, is, in certain cases, to be preferred, since the area of contact between the wires 42 and 43, through the photoconductive layer 44, in each of the members 40a to 40g, is in general greater than the corresponding area of contact between the strips 25 in the member 15. However, this area of contact in the member 15 may be increased by providing a greater number of strips 25 in each of the rows a to g. For example, five strips 25 may be provided in each of the rows a to g of the member 15, three of these five strips 25 being connected to the contact 29, and the remaining two strips 25, interposed between the three strips 25 connected to the contact 29, being connected to an individual one for that row of the contacts 28a to 28g.

The members 40a to 40g may be modified in a similar manner (not shown) to that in which the member 15 may be modified as described above, by providing the photoconductive layer 44 on each of the members 40a to 40g to lie on that surface of the member 41 therein, which is remote from the member 14. In this case the member 41 will be required to be transparent, and that portion of the shaft of light which is incident upon a particular combination of members 40a to 40g, will pass through the member 41 in each of those of the members 40a to 40g, to be incident upon the photoconductive layer 44 therein. As a result the resistance between the wires 42 and 43 in the region of such incidence, will fall from a relatively high value to a relatively low value, as in the case of the members 40a to 40g described above with reference to FIGURES 7 and 8.

Since light may only be incident upon the member 15 (or upon a number of members such as the members 40a to 40g, which function in the manner of the member 15) at positions thereof which lie directly behind transparent portions 22 in the member 14, the member 15 may be constructed such that there is electrical contact between the strips 25 and the photoconductive layer 26 only for those portions of the member 15, which lie directly behind the transparent portions 22. It will be appreciated that, if so desired, the member 14 may be dispensed with, by arranging that the photoconductive material of the layer 26 is deposited upon the member 15, only in a pattern similar to that of the transparent portions 22 of the member 14.

The photoconductive material used for the layer 26 of FIGURES 3 and 5 and for the layer 44 of FIGURE 7 may be any suitable material being photosensitive yet with substantially good insulating properties in the dark, for example cadmium sulphide activated with copper and chlorine. A method of manufacturing such material is described for example, in British patent application No. 37048/56. The required layer of this photoconductive material may be obtained by settling the photoconductive material from a solution of benzene, or amyl acetate, containing ethyl cellulose as a binder. Alternatively the layer may be formed by coating the surface upon which the layer is required with a suitable binder, for example, ethyl cellulose in amyl acetate, and then dusting the photoconductive material, in a fine powder form, on that surface.

It will be apparent that the shaft of light incident upon the member 14 may be produced other than by the cooperation of the members 10, 11 and 12 in the manner described above. For example it may be arranged that movement of the index 4 results in the rotation of a mirror (not shown) such that for such movement of the index 4, a shaft of light incident upon that mirror is caused to be reflected thereby onto the member 14, the instantaneous position of such incidence relative to the member 14 being dependent upon the instantaneous position of the index 4 relative to the scale 6.

We claim:

1. Electrical apparatus for providing an electrical indication in code form of the magnitude of an input variable comprising: an elongated photoconductive coding means including a plurality of rows of elements of photoconductive material, each of the rows of photoconductive elements extending lengthwise along the coding means and at least some of the rows including a plurality of the elements spaced from one another, the elements being positioned in the rows so that at each point along the length of the coding means those of the rows which include a said photoconductive element at that point are, in combination, characteristic of that point, and the coding means also including a plurality of pairs of spaced electrodes which electrode pairs are electrically connected to all said photoconductive elements in the rows respectively; and light beam directing means to direct a beam of light to be incident across said rows of photoconductive elements at a point along the length of the coding means which is dependent upon the magnitude of said input variable, the beam directing means including an optical element, and means that is responsive to said variable to position said optical element relative to said coding means in accordance with the magnitude of said input variable.

2. Electrical apparatus for providing an electrical indication in code form of the relative position of a pair of relatively movable members comprising: an elongated photoconductive coding means including a plurality of rows of elements of photoconductive material, each of the rows of photoconductive elements extending lengthwise along the coding means and at least some of the rows including a plurality of the elements spaced from one another, an elongated coding member that is generally opaque and which has a plurality of rows of transparent portions therein, said elements and said transparent portions being positioned in their rows so that at each point along the length of the coding means those of the rows which include a said element and a said transparent portion are in combination, characteristic according to a binary code of that point, and a plurality of pairs of spaced electrodes each said pair of which is electrically connected to the photoconductive elements in a respective one of said rows; means mounting the coding means in a fixed relationship with respect to a first member of said pair of relatively movable members; and light beam directing means to direct a movable beam of light to be incident across said rows of photoconductive elements at a point along the length of the coding means, the beam directing means including an optical element mounted upon the second member of said pair of relatively movable members to move with said second member relative to said first member and to direct the light beam to a point along the coding means which is dependent upon the position to which the optical element is so moved.

3. Electrical apparatus for providing an electrical indication in code form of the relative position of a pair of relatively movable members, comprising an elongated base-member of electrically insulating material fixedly mounted with respect to a first of said pair of relatively movable members, a plurality of pairs of elongated electrodes carried by the base-member and which extend lengthwise along the base-member in side-by-side relationship, the two electrodes of each pair being spaced apart from one another across the base-member, photoconductive material carried by the base-member and electrically in contact with the two electrodes of each pair, a light source, means to interrupt direct light paths from said source to said photoconductive material, an optical element for projecting a narrow light beam, means mounting the optical element upon the second of said pair of relatively movable members so that the optical element moves with said second member relative to said first member and projects a narrow beam of the light from the light source towards the photoconductive material in a direction which is dependent upon the relative position of said relatively movable members, an elongated substantially opaque coding member having a plurality of rows of transparent portions therein, the rows of transparent portions extending lengthwise along the opaque member and the transparent portions being positioned in the rows so that at each point along the length of the code member those of the rows which include a said transparent portion at that point are, in combination, characteristic of that point, means mounting the coding member lengthwise across the path of said beam of light to interrupt, except at the transparent portions, the transmission of the light of this beam to the photoconductive material.

4. Electrical apparatus according to claim 3 wherein said means to interrupt direct light paths from said source comprises two filters for plane polarized light, means mounting the two filters one behind the other between the light source and the photoconductive material with the respective planes of polarization for the two filters at right angles to one another, and wherein said optical element is an element for rotating through a right angle the plane of polarization of plane polarized light, this element being mounted upon said second member to lie between the two filters.

5. Electrical apparatus according to claim 4 wherein said optical element is a strip of mica.

6. Electrical apparatus according to claim 3 wherein said photoconductive material is cadmium sulphide activated with copper and chlorine.

7. Electrical coding apparatus for use in a telemetering system to provide coded electric signals representative of the magnitude of a given variable, comprising: an elongated photoconductive means which comprises a plurality of pairs of spaced electrodes which extend along the length of the photoconductive means, and photoconductive material interposed between the two electrodes of each pair; a source of light; an optical element for directing a narrow beam of light from said light source towards said photoconductive means; means which carries the optical element and is responsive to said given variable to move the optical element relative to said photoconductive means and thereby vary the direction of the light beam in dependence upon variation in the magnitude of said given variable; an elongated coding member fixedly mounted across the path of the light beam to interrupt light of the light beam at a plurality of positions across the coding member, the positions at which the light is interrupted across the coding member being in combination characteristic of the point at which the light beam is incident along the length of the coding member; and electric supply means connected to the two electrodes of each pair of electrodes to apply a voltage between these two electrodes.

8. Electrical coding apparatus according to claim 7 wherein said variable is voltage and wherein the means responsive to the variable is an electrical meter movement.

9. Electrical coding apparatus according to claim 8 wherein the meter movement has an index and the optical element is mounted on the index.

10. In a telemetering system, electrical coding apparatus according to claim 7 in combination with a plurality of relays which are connected to respective pairs of the electrodes in series with the supply means.

References Cited in the file of this patent

UNITED STATES PATENTS

| | | |
|---|---|---|
| 2,503,023 | Berry | Apr. 4, 1950 |
| 2,505,069 | Savino | Apr. 25, 1950 |
| 2,651,771 | Palmer | Sept. 8, 1953 |
| 2,707,749 | Mueller | May 30, 1955 |
| 2,807,799 | Rosenthal | Sept. 24, 1957 |
| 2,891,239 | Parsons | June 16, 1959 |

FOREIGN PATENTS

| | | |
|---|---|---|
| 353,591 | Great Britain | July 30, 1931 |
| 23,234/35 | Australia | June 25, 1935 |

OTHER REFERENCES

"Read Meter Optically, Then Digitizes," published by Control Engineering, March 1956 (page 107 relied on).